(No Model.) 4 Sheets—Sheet 1.

G. E. WITHERELL.
MACHINE FOR SHAVING BOLTS AND SCREWS OR OTHER ANALOGOUS ARTICLES.

No. 564,355. Patented July 21, 1896.

Witnesses:
J. A. Cantin
Arthur B. Jenkins

Inventor:
George E. Witherell
by Chas. L. Burdett,
Attorney.

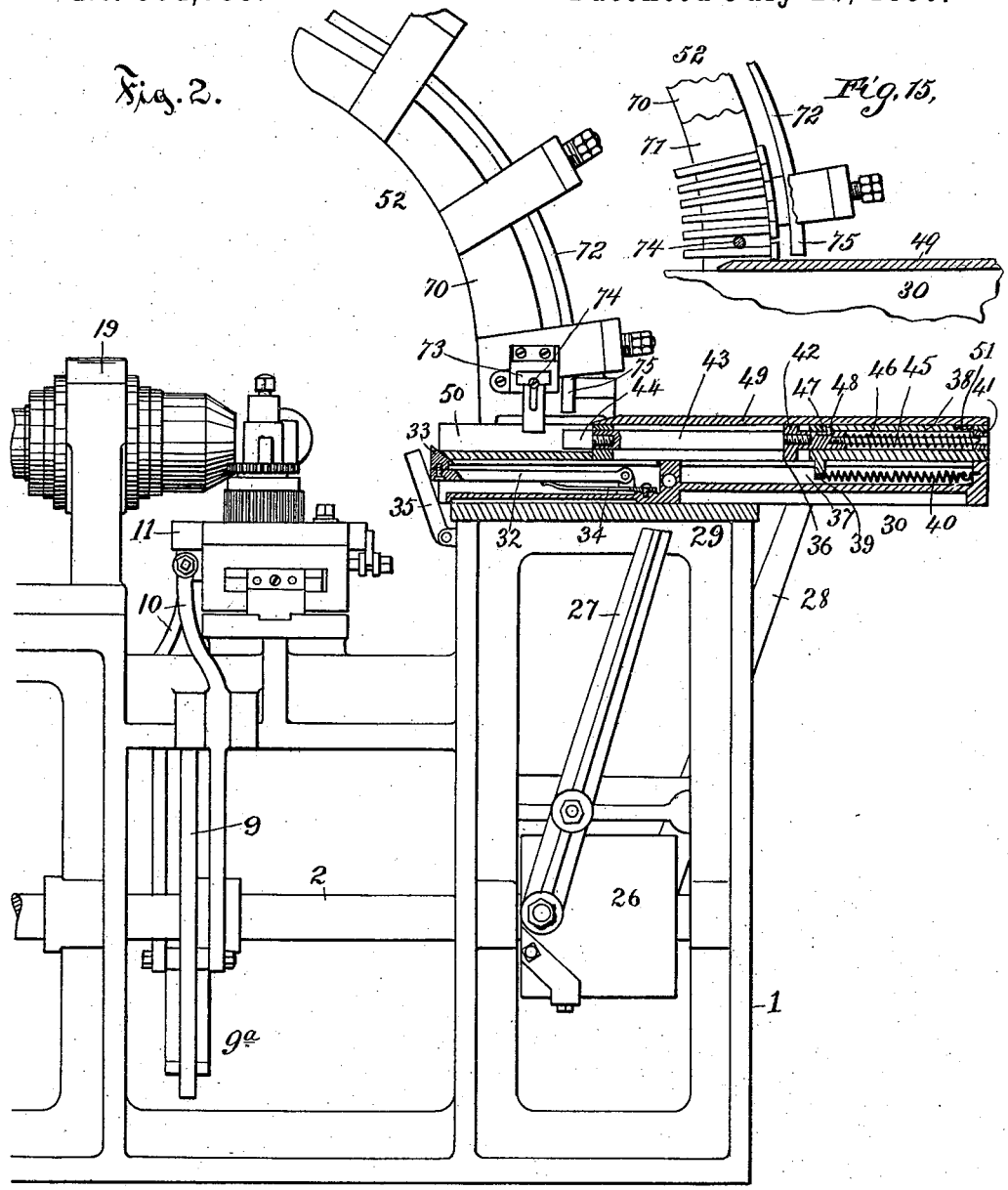

(No Model.) 4 Sheets—Sheet 3.
G. E. WITHERELL.
MACHINE FOR SHAVING BOLTS AND SCREWS OR OTHER ANALOGOUS ARTICLES.
No. 564,355. Patented July 21, 1896.
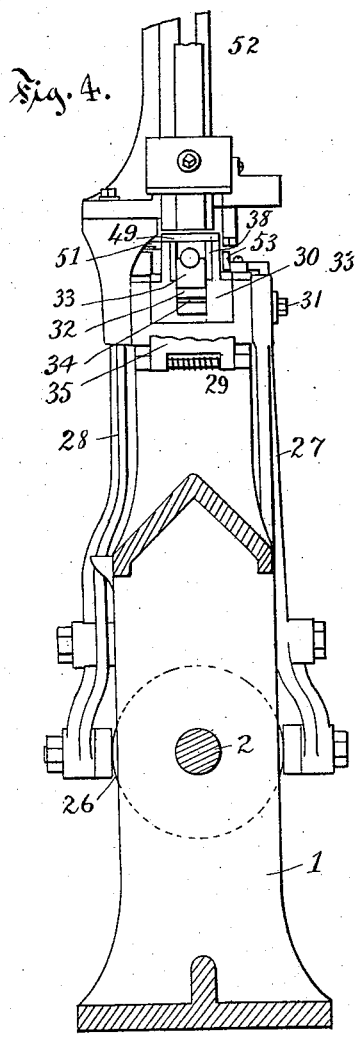
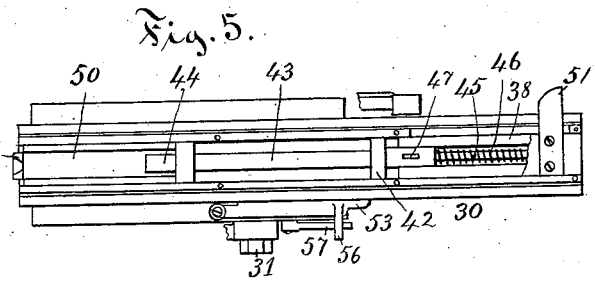
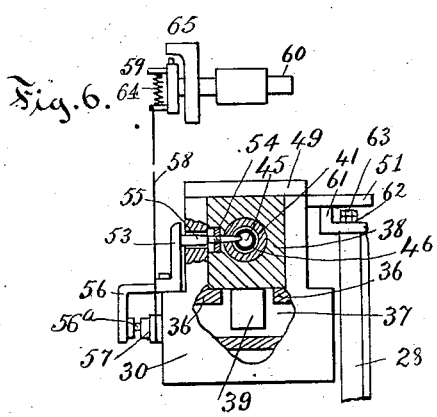
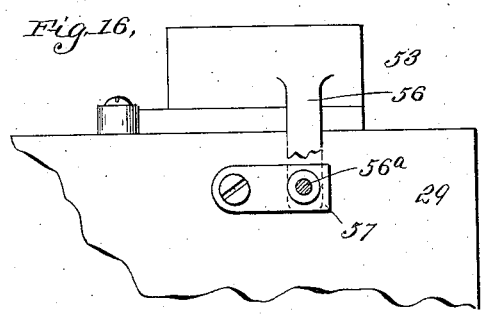
Witnesses:
J. A. Cantin
Arthur B. Jenkins
Inventor:
George E. Witherell
By Chas. L. Burdett,
Attorney.

(No Model.) 4 Sheets—Sheet 4.
G. E. WITHERELL.
MACHINE FOR SHAVING BOLTS AND SCREWS OR OTHER ANALOGOUS ARTICLES.
No. 564,355. Patented July 21, 1896.
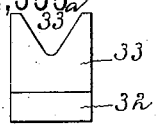
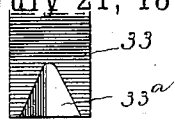
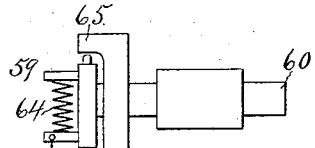
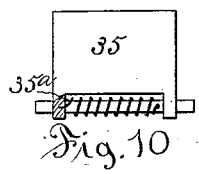
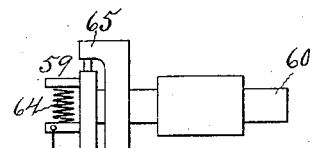
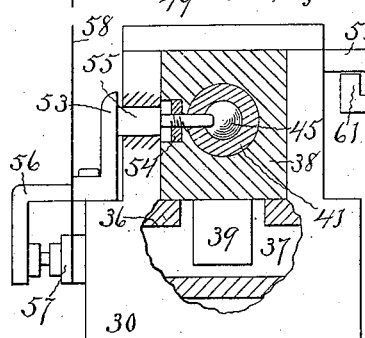
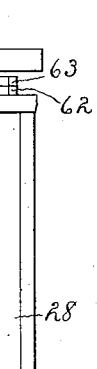
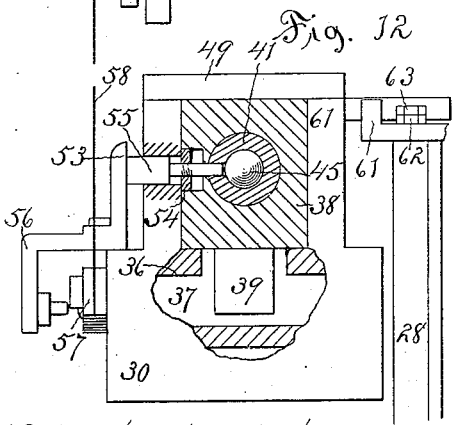
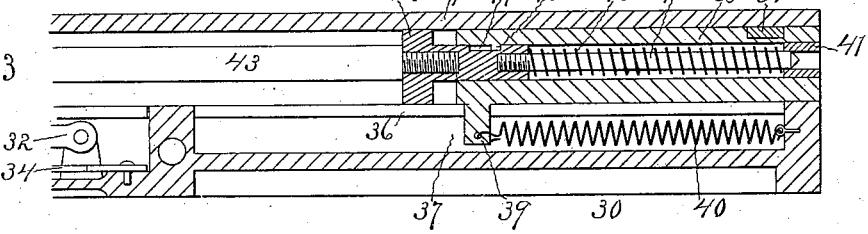
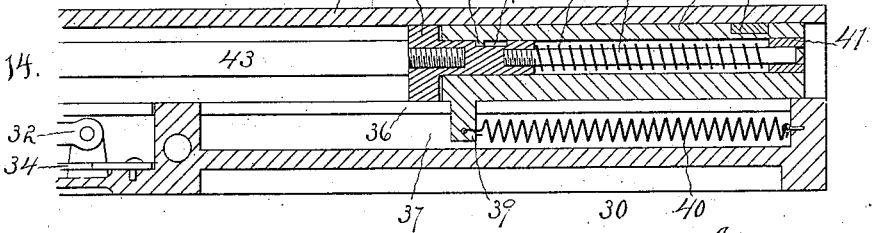
Witnesses:
Arthur B. Jenkins.
C. E. Buckland.
Inventor:
George E. Witherell.
by Chas. L. Burden,
Attorney.

UNITED STATES PATENT OFFICE.

GEORGE E. WITHERELL, OF HARTFORD, CONNECTICUT, ASSIGNOR TO THE HARTFORD MACHINE SCREW COMPANY, OF SAME PLACE.

MACHINE FOR SHAVING BOLTS AND SCREWS OR OTHER ANALOGOUS ARTICLES.

SPECIFICATION forming part of Letters Patent No. 564,355, dated July 21, 1896.

Application filed July 2, 1894. Serial No. 516,266. (No model.)

*To all whom it may concern:*

Be it known that I, GEORGE E. WITHERELL, a citizen of the United States, and a resident of Hartford, in the county of Hartford and State of Connecticut, have invented certain new and useful Improvements in Machines for Shaving Bolts and Screws or other Analogous Articles, of which the following is a full, clear, and exact description, whereby any one skilled in the art can make and use the same.

My invention relates to the class of machines in which a cutting-tool is used to shave or reduce to proper form articles held therein, and the object of my invention is to provide a machine of this class in which an article, as a bolt, screw, or the like, shall be automatically fed to a chuck, clamp, or like device, shaved and then automatically discharged therefrom.

To this end my invention consists in the details of the several parts embodied in the machine, and in the combination of such parts, as more particularly hereinafter described, and pointed out in the claims.

Figure 1:
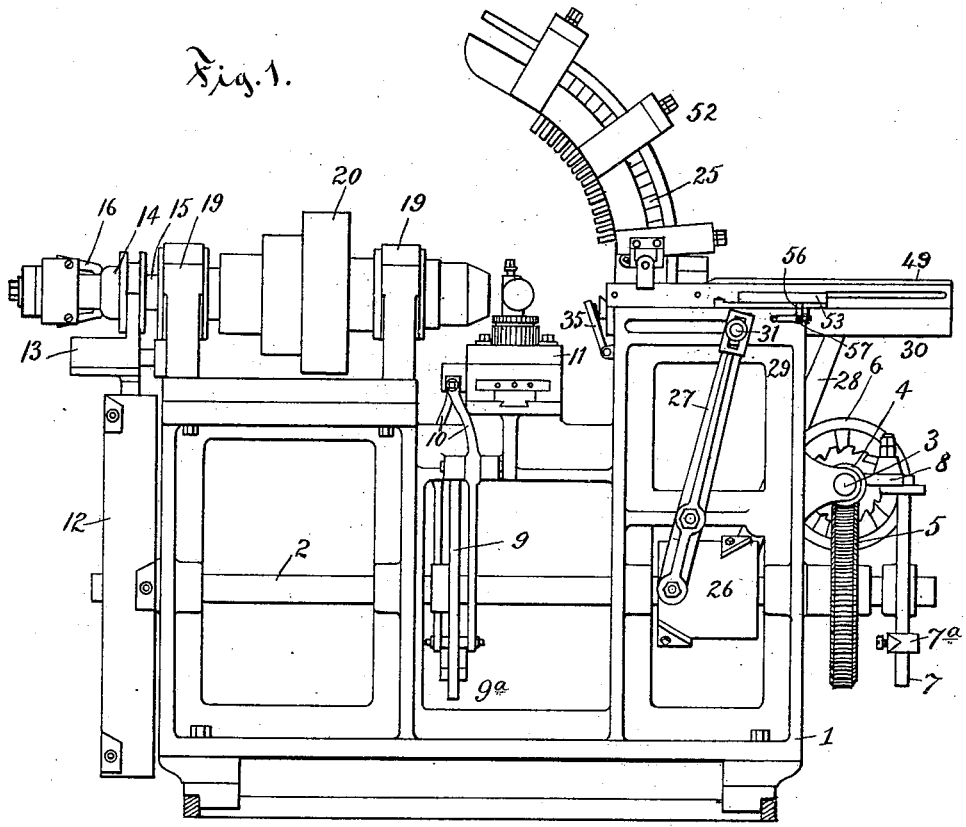
Figure 3:
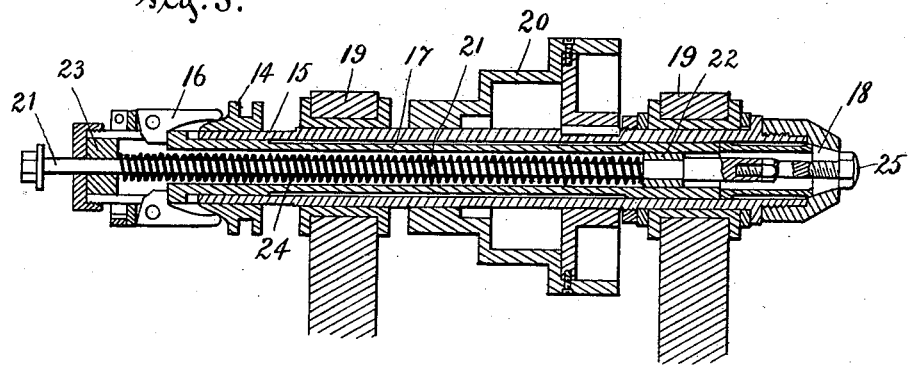

Referring to the drawings, Figure 1 is a view in front elevation of a machine embodying my improvement. Fig. 2 is a detail view, in front elevation, on enlarged scale, of one end of the machine. Fig. 3 is a detail view, in vertical section, on a plane passing through the axis of the chucking mechanism. Fig. 4 is a detail view, in end elevation, of the machine with the upper part of the guide broken away. Fig. 5 is a detail top or plan view of a portion of the carrier with parts broken away to show construction. Fig. 6 is a detail end view of the same with parts broken away to show construction. Fig. 7 is a detail end view of the centering-block. Fig. 8 is a detail top view of the front end of the centering-block. Fig. 9 is a detail view of the front end of the plunger in the carrier-slide. Fig. 10 is a detail view, in front elevation, of the spring-guard, partly in section, showing the spring arranged to hold it in its uppermost position. Fig. 11 is a detail view, on enlarged scale, partly in section, of the rear end of the carrier-slide, showing the stop-motion pin in its normal position and the stop-motion screw projected in front of the stop-motion pin. Fig. 12 is a similar view showing the stop-motion pin projected into the plug and the stop-motion lever forced outward to operate the stop-motion mechanism to stop the machine. Fig. 13 is a detail view, on enlarged scale, in longitudinal section, of the carrier-slide, showing the parts of the stop-motion mechanism in the same position as shown in Fig. 11. Fig. 14 is a similar view showing the parts in position as indicated in Fig. 12. Fig. 15 is a detail view showing the means for automatically feeding the bolts onto the plate and the stop for supplying them to the groove in the receiver. Fig. 16 is a detail view showing the latch of the stop-motion mechanism.

In the accompanying drawings, 1 denotes the frame of my improved machine, which may be constructed from any desired material, and mounted in suitable bearings therein is a main shaft 2. The main shaft may be driven from any suitable source of power and is shown herein as driven from a cross-shaft 3 by means of the intermeshing worm and gear 4 and 5, the shaft 3 being driven as by means of a belt passing around the pulley 6. A cam-disk 7 is also secured to the main shaft, a cam or cams $7^a$, secured to this disk, operating, in connection with a fast-and-slow motion 8, to increase or diminish the speed at which the main shaft is driven. This fast-and-slow motion may be of any well-known construction, and as it forms no part of the invention a further description is deemed unnecessary herein. There is also secured to the main shaft a cam-disk 9, having secured thereto cams $9^a$ for operating the slide-levers 10, these levers being in engagement with a slide 11, on which is mounted any desired form of cutting-tool for performing the shaving. These levers, slides, and manner of mounting the cutting device may be of any desired construction well known to this class of machines, and a further description of this mechanism is also deemed unnecessary herein. The cams and cam-disks referred to herein are of well-known construction in this class of machines, the cam-disk being a plain circular disk and the cams being adjustably secured to the edge or face of said disk in any desirable manner. There is also secured to the shaft a cam-wheel 12, bearing cams in engagement with the chucking-slide 13, that is in engagement with a chucking-wedge 14. This chucking-wedge is mounted on the spindle 15 and operates the fingers 16, pivoted therein. The fingers 16, in the swinging movement caused by the chucking-wedge 14, impart a longitudinal movement to a chucking-plunger 17, which movement causes a lateral movement of the chuck-jaws 18 to grasp or release a bolt or like article placed therein. The spindle is suitably mounted in bearings 19 in the frame of the machine and is driven from a countershaft, as by means of a belt passing around the pulley 20, secured to the spindle. The construction of this part of the chucking mechanism is well known, and a further description herein is deemed unnecessary.

The chucking-plunger 17 has a central opening, and extending lengthwise therethrough is an extracting-plunger 21. This extracting-plunger is borne in a suitable bushing 22, located in the chucking-plunger, and at its outer end in a bushing 23, secured within the spindle. An extractor-spring 24 surrounds the extracting-plunger 21, with one end thrusting against the bushing 23 and the other end against the bushing 22, the latter bearing against a shoulder on the extracting-plunger and tending to thrust the latter normally toward the chuck-jaws 18.

In the operation of this device a screw-bolt or like article 25 is forced in between the chuck-jaws 18 and encounters the end of the extracting-plunger 21, the latter being forced inward against the tension of the spring. As soon as the article has been forced in to the desired degree, the jaws, through the operating mechanism described, are caused to grasp the screw-bolt firmly and hold it until the shaving operation has been completed, the length of time during which it will be held in the jaws being controlled by the location of the cams on the cam-wheel 12, that operate the chucking-slide. At a predetermined time the jaws are released by the operation of the chucking-slide and the extracting-plunger 21 is forced outward under the impulse of the extracting-spring 24, ejecting a screw-bolt or like article held between the jaws. A cam-wheel 26 is secured to the main shaft 2, and cams are borne thereon in proper position to timely operate the carrier-lever 27 and plunger-lever 28, pivoted to the frame of the machine, the lower end of each of said levers being suitably located to engage the cams on the cam-wheel 26 at the proper time.

In the upper part 29 of the frame and lengthwise therein is formed a suitable slideway for the carrier-slide 30, an opening extending lengthwise through the side of the frame, through which projects a stud 31, secured to the carrier-slide, the outer end of the stud projecting into a slot in the upper end of the carrier-lever 27.

The carrier-slide is preferably provided with lateral flanges engaging corresponding sockets in the frame or standard, this construction preventing the slide from a vertical movement in the frame, and a centering-arm 32 is pivoted between ears projecting upward from the floor of the carrier, a removable centering-block 33 being secured to the outer end of the centering-arm. This centering-block is beveled on its rear side, a groove 33ᵃ being cut in its upper surface, this groove being of suitable shape to receive a screw-bolt or like article to be operated upon. The beveled surface and groove in this centering-block are of such form and dimensions as to allow the shank of a bolt being operated upon by the machine to lie in a horizontal position within the groove, the head of the bolt resting upon the upper surface of the centering-arm. This insures the placing of the screw-bolt within the chuck.

The centering-block is made removable, so that different blocks may be used to accommodate themselves to the different sizes of bolts or like articles to be formed in the machine. A centering-arm spring 34 is secured to the carrier-slide 30 and thrusts upward against the under side of the centering-arm, holding it normally in its uppermost position. A spring-guard 35 is pivoted to the frame of the machine and projects upward, lying in front of the carrier-slide, a spring being suitably arranged to hold it in its uppermost position, the carrier-slide throwing it downward as the former is moved forward.

One form of spring is shown in detail in Fig. 9 of the drawings, a spiral spring having one end secured to the spring-guard and the opposite end to the pivot on which it turns being employed.

Shoulders 36 are formed within the carrier-slide, a recess 37 being located thereunder, and on these shoulders is supported a plunger-bolt 38. A pin 39 projects downward from the under side of the plunger-bolt 38, and to this pin is secured one end of the spring 40, the opposite end of the spring being secured to the carrier-slide. The plunger-bolt has a lengthwise sliding movement in the carrier-slide, and has a central opening extending lengthwise therethrough, and a tubular plug 41 is located in the central opening at one end of the plunger-bolt. In the opposite end of the plunger-bolt is located the shank of a plunger-socket 42, to which is secured the plunger 43, as by means of interengaging screw-threaded parts. The outer end of this plunger is preferably concaved to receive the end of a screw-bolt or like part being operated upon in the machine. This end of the plunger is formed, preferably, by a removable tip 44, secured thereto, as by means of interengaging screw-threaded parts.

A stop-motion pin 45 is secured to the plunger-socket and extends rearward through the plunger-bolt, a space being left between the pin and bolt for the reception of a spring 46, the outer end of the stop-motion pin being preferably conical, as shown, and projecting into the opening in the plug 41. The spring 46 abuts against the plunger-socket 42 at its inner end and against the plug 41 at the outer end of the plunger-bolt, this plug being secured within the plunger-bolt preferably by means of interengaging screw-threaded parts. A slot 47 is formed in the upper surface of this plunger-socket 42, and into this slot projects a pin 48 from the plunger-bolt 38, this slot being of an extent to allow a limited movement of the plunger-socket within the plunger-bolt for a purpose to be hereinafter described. A plate 49 is secured to the upper side of the carrier-slide, closing the opening therein, this plate extending only a portion of the length of the slide, as shown.

A receiver 50 is secured in the forward end of the carrier, this receiver being slotted lengthwise for the reception of a screw-bolt or like device being operated upon in the machine, the bottom surface of the receiver being preferably concaved. The receiver is secured in the carrier by any suitable means, as by screw-bolts or pins.

A striking-plate 51 is secured to the plunger-bolt and projects outward through a slot running lengthwise in the side of the carrier-slide, this plate being located in such position that it will pass over the top of the plunger-lever 28 when the latter is at the rearward limit of its throw. The plate is located in the vertical plane of the lever and in such position as to be struck by the lever in its forward throw when the plunger-bolt has been carried forward to a certain extent by the movement of the carrier-slide.

A hopper-slide 52 is arranged in such position with reference to the carrier-slide as to deliver a screw-bolt or like article within the carrier at certain predetermined intervals, as at each rearward movement of the carrier. This hopper consists of a guideway having side parts 70 71, located a slight distance apart sufficient to form a space for the reception of the blanks to be operated upon, that travel down the slide by gravity. A cap 72 prevents the blanks from being accidentally removed from the slide, the heads of the blanks resting upon the upper side of the parts and the shanks extending between said parts. A slide 73, located on one of the side parts of the hopper-slide, supports a pin 74, that projects through one of the side parts into the space between said parts. This pin is located at a distance above the plate 49 to allow but a single blank to underlie the pin that projects in a line between two blanks. In the movement of the slide as the pin is withdrawn from the guideway the blanks move downward, the bottom one resting on the plate 49. The slide 73 then moves inward, projecting the pin between the first blank and the one next above it. The lower end of the cap 72 projects downward so near the plate 49 as to prevent a blank from sliding under the end, and thus forms a stop 75, which, striking the blank as the carrier-slide moves backward, holds it until the groove in the receiver is brought to a position underneath the blank, when it drops therein.

*Stop-motion device.*—A stop-motion lever 53 is preferably pivoted on the machine-frame, so as to have a swinging movement thereon, and a stop-motion spring 54 is secured within a recess in the side of the plunger-bolt. A stop-motion screw 55 is secured to the spring, as by means of interengaging screw-threaded parts, the screw passing through the spring and with its inner end lying in the path of movement of the conical end of the stop-motion pin 45, the end of the screw lying, preferably, one side of the center of the stop-motion pin in such position as to be engaged by the beveled end of the pin 45 and forced outward whenever the plunger-bolt is moved forward independent of the movement of the pin 45. The outer end of the screw lies back of the stop-motion lever 53, and in such manner that when forced outward by the movement of the plunger-bolt on the pin 45 it will strike against the stop-motion lever 53 and throw it outward.

It is obvious that in place of the pivoted stop-motion lever a sliding device may be mounted on the frame of the machine for accomplishing the same result.

A stop-motion arm 56 projects downward from the stop-motion lever 53, and on this arm is a lug 56ª, adapted to engage a socket in the latch 57. This latch is pivoted on the machine-frame and is held in its lowermost position by the engagement of the lug 56ª on the arm with the socket in the latch. A cord 58 is secured to the latch and extends upward, the opposite end of the cord being attached to the spring-plunger 59 of a friction-clutch mechanism. A spring 64 is connected to this plunger and tends to force it upward, in which position it is engaged by a cam 65 on the pulley-shaft, which engagement forces the shifting rod 60, bearing the plunger, to one side, releasing the clutch mechanism on the shaft. This form of clutch mechanism in engagement with the shaft may be of any well-known construction, and as it forms no part of the present invention a further description is deemed unnecessary herein.

The end of the plunger-lever 28 is provided with a swinging lug 61, that engages the striking-plate 51, a nut 62 being used to bind this swinging lug against a shoulder on the lever, and a lock-nut 63 being used to hold the parts in any desired position. In use the nut 62 is brought against the swinging lug 61 with a pressure sufficient to allow the latter to turn under certain pressure, and the lock-nut is used to secure it in this position. The object of this construction is to allow the lug to swing backward out of engagement with the striking-plate whenever an obstruction is presented to the forward movement of the plunger 43 and for any reason the stop-motion does not act quick enough to stop the machine. It is to be noted that in the construction herein shown when the carrier-slide is moved forward the stop-motion screw 55 is carried back of the stop-motion lever 53 and lies continually back of it during the forward movement of the plunger 43, so as to act upon it at any instant.

The operation of the device is as follows: The parts being in the position shown in Fig. 1, with the chucking-wedge 14 at the inner limit of its play, causing the jaws 18 to be relaxed, and the carrier-slide at the backward limit of its play, the cam-wheel 26 in its revolution brings one of the cams into engagement with the lever 27 and forces the carrier-slide with the mechanism supported thereon forward till the centering-block 33, borne on the forward end of the slide, is brought into proper position adjacent to that end of the spindle bearing the chuck-jaws, a screw-bolt or like article having previously been deposited in the slot in the receiver 50. In this operation the striking-plate 51 has been carried to a position forward of the upper end of the plunger-lever 28, which latter is now forced forward by the action of the cams on the cam-wheel 26. The upper end of this lever engages the striking-plate 51 and forces it forward, carrying with it the plunger-bolt to which it is secured. The plunger-bolt engaging the end of the stop-motion spring 46 forces the plunger-socket 42 and plunger 43, secured thereto, forward, carrying with it the screw-bolt or like article which lies against the end of the plunger in the receiver 50. In this forward movement of the plunger 43 the front end of the screw-bolt is carried up the incline on the centering-block into proper position to be forced into the opening in the end of the spindle 15 and between the chuck-jaws 18, the end of the bolt striking the extracting-plunger 21 and forcing it backward against the force of the extracting-spring 24. At this time the chucking-slide 13 is carried backward against the fingers 16, forcing them outward and closing the jaws upon the screw-bolt placed therebetween. A cam on the cam-wheel 26 now throws the plunger-lever 28 backward, that is immediately followed by the plunger-bolt under the impulse of the spring 40, and then the carrier and the mechanism supported thereon, including the plunger-bolt, is moved backward under the impulse of the carrier-lever 27, acted upon by the cams on the cam-wheel 26, in this operation the striking-plate 51 being carried over the upper end of the plunger-lever 28, the latter being swung far enough back to allow this. The slide 11 is now operated by the cam-disk 9 through the medium of the levers 10 to bring the cutting-tools borne thereon into contact with the screw-bolt or like article to cut or shave the same. When the proper amount of cutting has been accomplished by the cutting device, the slide 11 is carried away from the screw-bolt, and the cams on the cam-wheel 12 operate the chucking-slide 13 to carry it forward to the position shown in Fig. 1, retracting the chuck-jaws 18 and allowing the extracting-spring 24 to act upon the extracting-plunger 21 and force the screw-bolt out from the spindle, the former striking the spring-guard 35. This spring-guard is forced downward as the carrier-slide is forced forward, but immediately returns to place on the backward movement of the latter, and the pivoting of the centering-arm 32 allows it to swing downward from underneath the head of the screw-bolt as it is grasped by the chuck-jaws and on the backward movement of the carrier-slide.

In the forward movement of the plunger 43 should the bolt not be forced into the opening in the chuck-jaws, but encounter the end of the spindle, or any other obstruction be offered thereto, the stop-motion spring 46 at once contracts under the increased strain put upon the plunger-bolt, and the latter moves forward independent of the plunger and to an extent determined by the length of the slot 47, located in the plunger-socket 42, the pin 48 stopping this independent forward movement of the plunger-bolt. In this forward movement of the plunger-bolt the plug 41 is also carried forward upon the pin 55 against the beveled end of the stop-motion pin 45, in which operation the pin 55 is immediately forced outward by the engagement with the conical end of the pin 45 and comes in contact with the stop-motion lever 53, forcing it outward, and also out of engagement with the latch 57, which latter is immediately drawn upward under the pull of the spring-plunger 59, which immediately acts to release the clutch mechanism and stop the machine.

The stop-motion has been illustrated and described herein as comprising a stop-motion pin adapted to force a spring-actuated stop-motion screw outward against a stop-motion lever to operate the latter, the stop-motion screw coming in contact with the conical end of the stop-motion pin, but any device in which the stop-motion lever is given a movement, to disengage it from a trip device, through the medium of a stop-motion device interposed between said lever and the stop-motion pin and by the movement of the one device upon the other will come within the scope of my invention.

While, strictly speaking, the stop-motion pin has no movement to cause the operation of the stop-motion lever, such operation being caused by the movement of other parts upon the pin, yet this movement is described in the claims as the movement of the stop-motion pin, and by such term is meant any device in which is included a stop-motion pin and adjacent parts movable one with the other.

I claim as my invention—

1. In combination, a chuck or like device for automatically grasping and holding an article to be operated upon, a reciprocating receiver borne in operative relation to the chuck, means for reciprocating the receiver, a centering-arm borne in the receiver, a plunger having a reciprocating motion on the receiver, and means for reciprocating the plunger, all substantially as described.

2. In combination, a chuck or like device for automatically grasping and holding an article to be operated upon, a reciprocating receiver borne in operative relation to the chuck, means for reciprocating the receiver, a spring-actuated centering-arm borne in the receiver, a reciprocating plunger borne on the receiver, and means for reciprocating the plunger, all substantially as described.

3. In combination with a chuck or like device for automatically grasping and holding an article to be operated upon, a reciprocating receiver borne in operative relation to the chuck, means for reciprocating the receiver, a spring-guard normally lying in front of the receiver, a reciprocating plunger borne on the receiver, and means for reciprocating the plunger, all substantially as described.

4. In combination with a chuck or like device for automatically grasping and holding an article to be operated upon, a reciprocating receiver borne in operative relation to the chuck, means for reciprocating the receiver, a centering-arm borne in the receiver, a spring-guard lying in front of the centering-arm, a reciprocating plunger borne on the receiver, and means for reciprocating the plunger, all substantially as described.

5. In combination with a chuck or like device for automatically grasping and holding an article to be operated upon, a reciprocating receiver borne in operative relation to the chuck, a reciprocating plunger borne on the receiver, means for simultaneously reciprocating the receiver and plunger, and means for reciprocating the plunger independently of the receiver, whereby a blank is moved along the receiver, all substantially as described.

6. In combination with a chuck or like device for automatically grasping and holding an article to be operated upon, a reciprocating receiver borne in operative relation to the chuck, means for reciprocating the receiver, a reciprocating plunger located on the receiver, a lever adapted to impart a forward movement to the plunger, whereby a blank is moved along the receiver, and means for imparting a rearward movement to the plunger independent of said lever, all substantially as described.

7. In combination with a chuck or like device for automatically receiving and holding an article to be operated upon, a reciprocating receiver borne in operative relation to the chuck, means for reciprocating the receiver, a reciprocating plunger borne on the receiver, a lever adapted to impart a forward movement to the plunger, a striking-plate connected with the plunger and adapted to pass over the top of said lever, in the forward movement of the receiver, but lying in the path of said lever when the receiver is at its forward point of rest, and a spring connected with the plunger and with the receiver to draw the former backward, all substantially as described.

8. In combination with a chuck or like device for automatically grasping and holding an article to be operated upon, a reciprocating receiver borne in operative relation to the chuck, means for reciprocating the receiver, a plunger borne on the receiver, means for reciprocating the plunger, whereby a blank is moved along the receiver, and means for automatically feeding to the receiver the article to be operated upon, all substantially as described.

9. In combination in a shaving-machine, a spindle rotarily mounted thereon, a chucking-plunger having a lengthwise movement in the spindle, chuck-jaws borne on the plunger, means for automatically reciprocating the plunger to open and close the jaws, a spring-actuated extracting-plunger located in the chucking-plunger and adapted to exert pressure upon an article held between the jaws, a reciprocating receiver borne in operative relation to the chuck, means for reciprocating the receiver, a reciprocating plunger borne on the receiver, means for reciprocating the plunger, whereby a blank is fed to the chuck, and means for automatically feeding to the receiver an article to be operated upon, all substantially as described.

10. In a stop-motion, a stop-motion pin, a spring-actuated stop-motion screw thrusting normally toward the stop-motion pin and lying in the path of movement thereof, and a swinging stop-motion lever located in the path of movement of the stop-motion screw and connected with a clutch mechanism, all substantially as described.

11. In a stop-motion, a stop-motion pin having a beveled surface, a bushing adapted to slide on the pin, a spring thrusting the bushing normally away from a beveled surface on the stop-motion pin, a spring-actuated stop-motion screw carried with the bushing, and a swinging stop-motion lever actuated by the stop-motion screw, whereby a clutch mechanism is released, all substantially as described.

12. In a stop-motion, a stop-motion pin having a beveled surface, a bushing adapted to slide lengthwise of the stop-motion pin, a spring thrusting the bushing normally away from the beveled surface thereon, a spring-actuated stop-motion screw projecting through the bushing, thrusting normally toward the stop-motion pin and lying in the path of movement of the beveled surface thereon, a swinging stop-motion lever adapted to be operated by the spring-actuated screw, a latch in engagement with the stop-motion lever and adapted to be released thereby, and a connection between the latch and a spring-operated clutch, whereby the latter is released, all substantially as described.

13. In a stop-motion, a stop-motion pin having a beveled end, a bushing adapted to move lengthwise of and having a central opening adapted to receive the stop-motion pin, a spring forcing the bushing normally away from the end of the stop-motion pin, a spring-actuated stop-motion screw thrusting normally into the opening in the bushing and adapted to engage the beveled surface on the stop-motion pin, a swinging stop-motion lever actuated by the stop-motion screw, a latch in engagement with the stop-motion lever and adapted to be released on the swinging movement of the latter, and a connection between the latch and a spring-actuated clutch device whereby the latter is released, all substantially as described.

14. In combination with a chuck or like device for automatically grasping and holding an article to be operated upon, a reciprocating receiver borne in operative relation to the chuck, means for reciprocating the receiver, a plunger borne on the receiver, a stop-motion pin connected with the plunger and bearing a beveled surface, a reciprocating striking-plate, a spring interposed between the striking-plate and plunger, means for moving the striking-plate, a spring-actuated stop-motion screw thrusting normally toward the stop-motion pin and lying in the path of movement of the beveled surface thereon, and a swinging stop-motion lever adapted to be operated by the spring-actuated pin whereby a clutch device is released, all substantially as described.

15. In combination with a chuck or like device for automatically grasping and holding an article to be operated upon, a reciprocating receiver borne in operative relation to the chuck, means for reciprocating the receiver, a plunger borne by the receiver, a striking-plate connected with the plunger, a spring interposed between the striking-plate and plunger thrusting the two normally apart, means for moving the striking-plate, a stop-motion pin connected with the plunger and having a beveled end, a socket located in the plunger, a pin projected into the socket and limiting the lengthwise movement of the striking-plate independent of the plunger, a spring-actuated stop-motion screw lying in a position to engage the beveled end of the stop-motion pin, a swinging stop-motion lever adapted to be operated by the stop-motion screw, and a latch in engagement with the stop-motion lever and adapted to be released therefrom by the movement of the latter whereby a clutch device is released, all substantially as described.

16. In combination with a chuck or like device for automatically grasping and holding an article to be operated upon, a reciprocating receiver borne in operative relation to the chuck, means for reciprocating the receiver, a plunger borne by the receiver, a plunger-bolt connected with the plunger but adapted to have a limited lengthwise movement independent thereof, a socket located in the plunger, a pin borne by the plunger-bolt and projecting into the socket in the plunger, a striking-plate secured to the plunger-bolt, means for reciprocating the striking-plate, a stop-motion pin secured to the plunger and adapted to pass through an opening in the end of the plunger-bolt, a spring interposed between the plunger and the plunger-bolt, a spring-actuated stop-motion screw projecting through the plunger-bolt and adapted to engage the stop-motion pin, a swinging stop-motion lever adapted to be engaged by the stop-motion screw, whereby a clutch mechanism is released, all substantially as described.

17. In combination with a chuck or like device for grasping and holding an article to be operated upon, a reciprocating receiver borne in operative relation to the chuck, means for reciprocating the receiver, a reciprocating plunger borne by the receiver, a plate overlying the plunger and adapted to receive a screw-bolt delivered thereon, means for automatically delivering a screw-bolt on the plate, and a stop located in the path of movement of the screw-bolt on the plate whereby it is pushed into the receiver in the backward movement of the latter, all substantially as described.

18. In combination with a chuck or like device for grasping and holding an article to be operated upon a reciprocating receiver borne in operative relation to the chuck, means for reciprocating the receiver, a reciprocating plunger borne by the receiver, a pivoted lever bearing and swinging lug adapted to engage the plunger, the swinging lug borne on the lever, and means for securing the lug to the lever in such manner that it will yield under a certain amount of pressure, all substantially as described.

19. In a stop-motion, a stop-motion pin, a stop-motion screw supported in operative relation to the stop-motion pin the former adapted to be moved longitudinally by a sliding movement of the one upon the other, and a swinging stop-motion lever actuated by the longitudinal movement of the stop-motion screw whereby a clutch mechanism is released, all substantially as described.

20. In a stop-motion mechanism, a movable stop-motion pin, a stop-motion lever having a movement transversely to the plane of movement of the stop-motion pin and connected with a clutch mechanism, and means for operating the lever by the movement of the stop-motion pin, all substantially as described.

21. In a stop-motion mechanism, a movable stop-motion pin, a stop-motion lever having a movement in a plane transversely to the plane of movement of the stop-motion pin, means for moving the lever by the movement of the pin, and a spring-actuated latch connected with a clutch mechanism and adapted to be released by the movement of the stop-motion lever, all substantially as described.

GEORGE E. WITHERELL.

Witnesses:
CHAS. L. BURDETT,
ARTHUR B. JENKINS.